US005952636A

United States Patent [19]

Morita et al.

[11] Patent Number: 5,952,636

[45] Date of Patent: Sep. 14, 1999

[54] VACUUM TYPE SWITCH GEAR DEVICE HAVING L SHAPED STATIONARY AND MOVABLE CONDUCTORS ARRANGEMENT

[75] Inventors: Ayumu Morita; Takashi Sato, both of Hitachi; Youichi Ohshita, Hitachinaka; Tooru Tanimizu; Masayoshi Hayakawa, both of Hitachi; Toshio Horikoshi, Fujioka; Ryutaro Yamamoto, Komae, all of Japan

[73] Assignees: Hitachi, Ltd.; The Tokyo Electric Power Co., Ltd., both of Tokyo, Japan

[21] Appl. No.: 09/104,197

[22] Filed: Jun. 25, 1998

[30] Foreign Application Priority Data

Jun. 27, 1997 [JP] Japan .................................... 9-172026

[51] Int. Cl.$^{6}$ .................................................... H01M 33/66

[52] U.S. Cl. ........................... 218/118; 218/123; 218/128

[58] Field of Search .................................... 335/118, 120, 335/123, 124, 125, 126, 127, 128, 140, 146

[56] References Cited

U.S. PATENT DOCUMENTS 4,415,787 11/1983 Yamanaka .
4,695,689 9/1987 Kurosawa et al. .
4,885,442 12/1989 Kriechbaum ............................ 200/140
5,495,085 2/1996 Yorita et al. ............................ 218/213
5,719,365 2/1998 Tanimizu et al. ........................ 218/118
5,763,848 6/1998 Hakamata et al. ....................... 218/128

FOREIGN PATENT DOCUMENTS 740321 10/1996 European Pat. Off. .
766277 4/1997 European Pat. Off. .
55-143727 11/1980 Japan .

*Primary Examiner*—Lincoln Donovan
*Attorney, Agent, or Firm*—Fay, Sharpe, Beall, Fagan, Minnich & McKee

[57] ABSTRACT

In a vacuum type switch gear device an L shaped stationary and movable conductors arrangement, a transitive portion from one spiral arc groove to a neighboring another spiral arc groove on the surface of a movable electrode defined by the terminating end portion of the one spiral groove, the starting end of the adjacent neighboring other spiral groove and the outer circumferential edge portion of the movable electrode is arranged in a substantially overlapping relationship in a vertical direction with the movable conductor. Thus an adverse effect of a current loop flowing through the movable conductor against an arc generated between movable and stationary electrodes is limited to thereby improve the circuit breaking performance.

8 Claims, 7 Drawing Sheets

VACUUM TYPE SWITCH GEAR DEVICE HAVING L SHAPED STATIONARY AND MOVABLE CONDUCTORS ARRANGEMENT

BACKGROUND OF THE INVENTION

1. Field of the Invention

The present invention relates to a vacuum type switch gear device having an L shaped stationary and movable conductors arrangement and, more specifically, to a composite vacuum type switch gear device in which an arrangement between a movable conductor and arc grooves provided for a movable electrode carried by the movable conductor is, in particular, improved.

2. Conventional Art

In a vacuum circuit breaker, making and breaking operation is performed by opening and closing a pair of electrodes disposed in an opposing manner within a vacuum bulb. Generally, through vertical displacement of a movable rod or conductor with respect to a stationary rod or conductor by means of an operating mechanism disposed outside the vacuum bulb, electrodes provided each at an end of the respective rods are opened and closed.

Further, in the vacuum circuit breaker disclosed in JP-A-55-143727 (1980), a movable electrode is designed to be rotatable around a main axis so as to open and close the same with respect to a stationary electrode.

Generally, when an arc stays at a portion between both electrodes during circuit breaking operation of a circuit breaker, the surface temperature of each of the electrodes increases due to thermal energy input from the arcing to thereby cause melting of the metal of the electrodes. In such instance, consumption of the electrodes is significant and, as well surplus vapour metal particles produced between the electrodes extremely reduce circuit breaking performance.

Therefore, in vacuum circuit breakers, and in particular, those for interrupting a large current, a variety of measures have been proposed for the structure of the arc electrodes. For example, with arc electrodes having a plurality of spiral arc grooves, an arc generated between the electrodes is applied of a driving force in a circumferential direction by a current flowing through both electrodes and is always moved between both electrodes to thereby suppress the melting of the metal surface of the electrodes and to improve its circuit breaking performance.

However, with the conventional movable conductor or rod rotatable type vacuum circuit breaker as mentioned above which makes use of electrodes having spiral arc grooves, an arc generated between the electrodes is subjected to an additional electric-magnetic force due to magnetic fluxes induced by a current flowing through the movable conductor located near the electrodes. As a result, an area on the electrode on which an arc can be ignited, namely an effective arcing area on the electrode, is limited to thereby reduce the circuit breaking performance thereof.

SUMMARY OF THE INVENTION

An object of the present invention is to provide a vacuum type switch gear device having an L shaped stationary and movable conductors arrangement in which an adverse effect of a current loop flowing through the movable conductor against an arc generated between movable and stationary electrodes is limited to thereby improve its circuit breaking performance and, more specifically, to provide a composite vacuum type switch gear device which permits an active magnetic drive of an arc generated between electrodes along the outer circumference of the electrodes and improves its circuit breaking performance.

According to one aspect of the present invention which achieves the above object, a vacuum type switch gear device having an L shaped stationary and movable conductors arrangement is constituted by a vacuum bulb; a stationary conductor, a part of which is disposed in the vacuum bulb; a stationary electrode carried by the stationary conductor at one end thereof in the vacuum bulb; a movable conductor disposed in the vacuum bulb and extending substantially orthogonal with respect to the extending direction of the stationary conductor, the movable conductor being supported rotatably by the vacuum bulb; a movable electrode carried by the movable conductor at one end thereof in the vacuum bulb and being permitted engagement and disengagement thereof with the stationary electrode through rotation of the movable conductor; a plurality of spiral arc grooves provided on the surface of the stationary electrode facing the movable electrode; and, a plurality of spiral arc grooves provided on the surface of the movable electrode facing the stationary electrode, wherein a transitive portion from one spiral arc groove to adjacent another spiral arc groove on the surface of the movable electrode defined by the terminating end portion of the one spiral groove, the starting end of the adjacent other spiral groove and the outer circumferential edge portion of the movable electrode is arranged in a substantially overlapping relationship in vertical direction with the movable conductor.

According to another aspect of the present invention which achieves the above object, a composite vacuum type switch gear device is constituted by a movable electrode which is designed to open and close with respect to a stationary electrode and a grounding electrode which are disposed in an opposing manner within a vacuum bulb and a movable conductor one end of which carries to the movable electrode and the other end of which extends outside from the vacuum bulb, wherein the movable conductor is rotatably supported by a main axis so as to permit opening and closing of the movable electrode with respect to both stationary and grounding electrodes and a plurality of arc grooves are provided on one movable electrode face of the movable electrode which contacts both stationary and grounding electrodes, and further a portion surrounded by a top end portion of one of the arc grooves, a neighboring other arc groove and the outer circumferential edge portion of the movable electrode is placed so as to face the movable conductor.

DETAILED DESCRIPTION OF THE EMBODIMENTS OF THE PRESENT INVENTION

Figure 1:
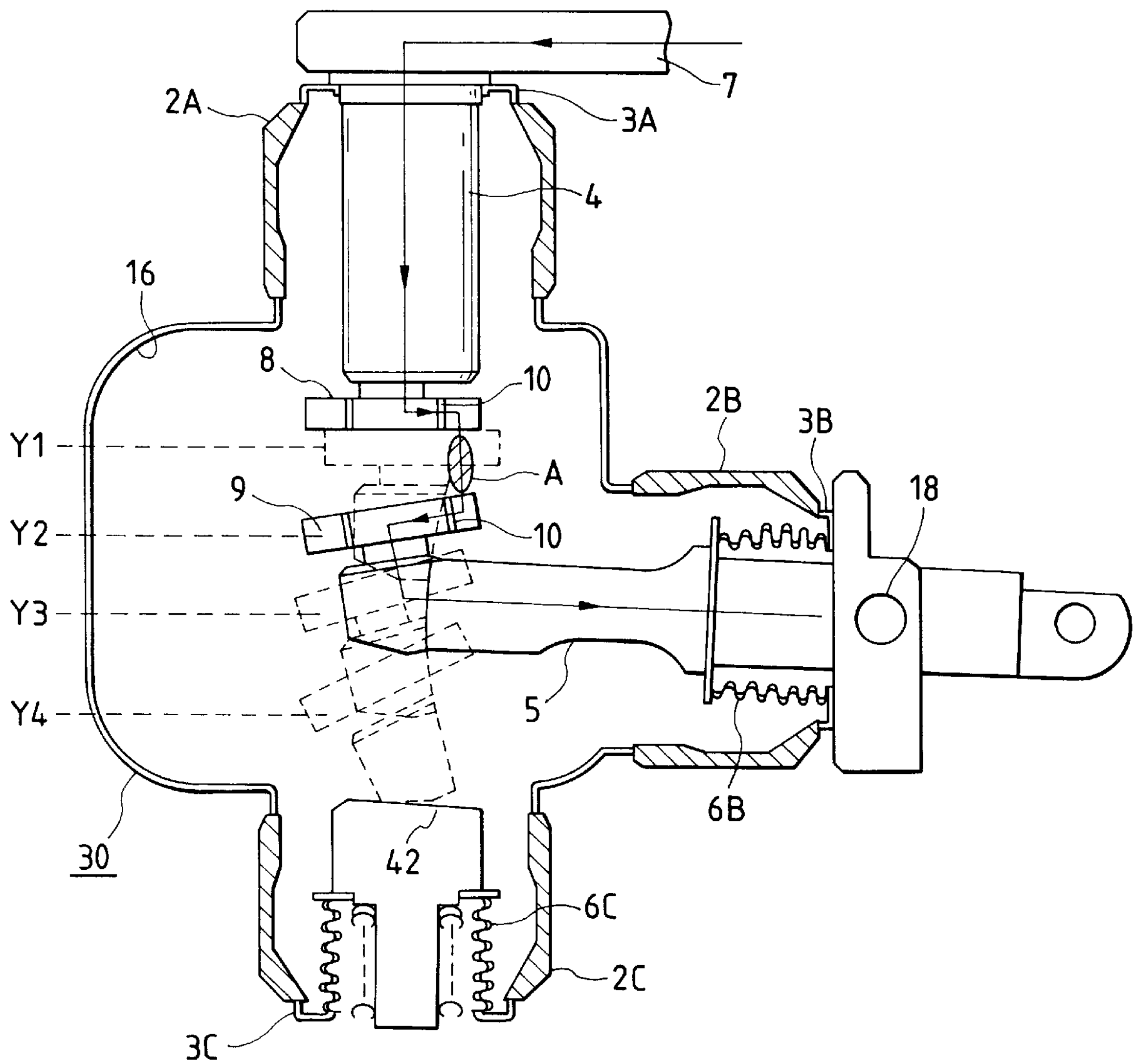
FIG. 1 is a cross sectional view of a composite vacuum type switch gear device representing an embodiment of the present invention.
Figure 2:
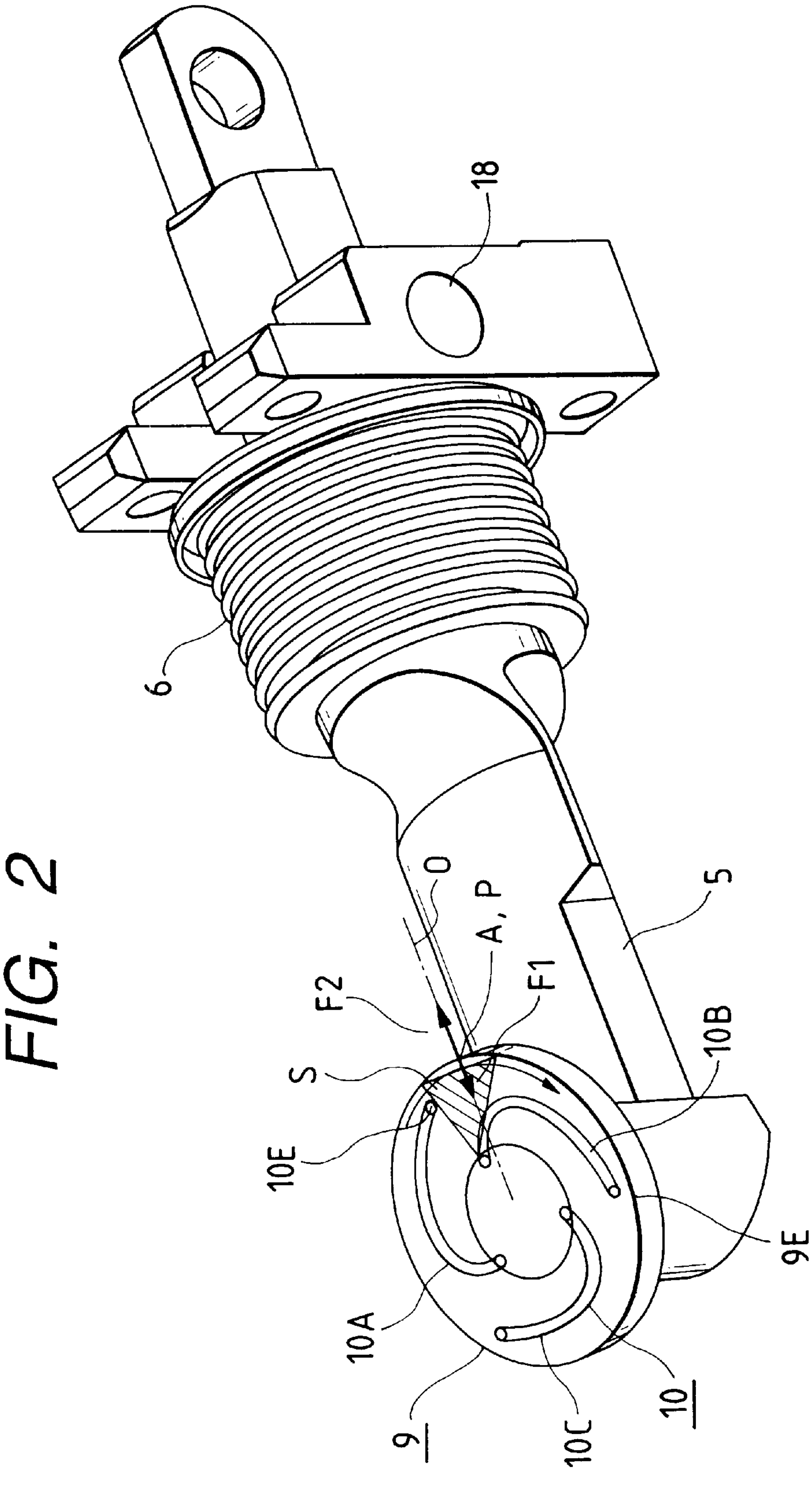
FIG. 2 is a perspective view of a movable member including a movable electrode and a movable conductor carrying the movable electrode used in the FIG. 1 embodiment.

Now, an embodiment of the present invention is explained with reference to FIGS. 1 and 2.

A vacuum valve 30 is constituted as will be explained herein below and the inside thereof is evacuated and sealed. At the upper portion of a metal casing 16 an insulator cylinder 2A is provided. A stationary rod 4 is fixed by a seal metal fitting 3A provided at the top of the insulator cylinder 2A. At an insulator cylinder 2C provided at the bottom of the metal casing 16 a seal metal fitting 3C is attached and the displacement of a grounding conductor 42 is permitted by a bellows 6C fixed between the seal metal fitting 3C and the grounding conductor 42. A movable rod 5, which is disposed in an orthogonal direction with respect to the stationary rod 4, is extended outside of the vacuum valve 30, and is held by an insulator cylinder 2B secured to the metal casing 16 through a bellows 6B and a seal metal fitting 3B. At the contacting faces of the movable rod 5 with the stationary rod 4 carrying a stationary electrode 8 and the grounding conductor 42 a movable electrode 9 is connected, and the stationary electrode 8 and the movable electrode 9 are connected to the respective inner ends of the stationary rod 4 and the movable rod 5.

The movable rod 5 is structured to be rotatable around a main axis 18 as a fulcrum by a four position type operating unit (not shown) and is designed to stop at the following four positions. Namely, a circuit making position Y1 where the movable electrode 9 contacts to the stationary electrode 8, a circuit breaking position Y2 where the movable rod 5 is rotated downward from the circuit making position Y1 to interrupt a current flowing therethrough, a disconnecting position Y3 where the movable rod 5 is further rotated downward to an insulation distance through which such as a lightning surge can be withstood, and a grounding position Y4 where the movable rod 5 is further rotated to contact the movable electrode 9 with the grounding conductor 42.

At the respective top ends of the stationary rod 4 and the movable rod 5 the stationary electrode 8 and the movable electrode 9 made of a material having a high melting temperature such as Cu—Pb alloy are provided. When an arc A is concentrically generated at a certain one point between the both stationary and movable electrodes 8 and 9, the surface temperature of the both stationary and movable electrodes 8 and 9 rises and the metal of the both stationary and movable electrodes 8 and 9 is caused to melt and is vaporized, therefore, it is necessary to apply the arc A a magnetic driving force so as to always move or run the arc A between the stationary and movable electrodes 8 and 9. For this purpose, as shown in FIG. 2, both the stationary and movable electrodes 8 and 9 are provided with a plurality of arc grooves. In the present embodiment three arc grooves 10 (10A, 10B and 10C) are provided so as to apply a magnetic driving force to the arc A. A transitive portion S from one arc groove to another surrounded by a top end portion 10E of, for example, the arc groove 10A, another arc groove 10B neighboring thereto and an electrode outer circumferential edge 9E is arranged so as to face the movable rod 5. In other words, the projection of the transitive portion S is arranged so as to overlap on the movable rod 5 a in vertical direction.

Now, the electric-magnetic force acting on the arc A will be explained. As illustrated in FIGS. 1 and 2, through a magnetic field generated by a current flowing through the both stationary and movable electrodes 8 and 9 via the arc A in the arrowed direction, an electric-magnetic force F2 according to Fleming's rule acts on the arc A generated between the stationary and movable electrodes 8 and 9 in the rightward direction in the drawings. The electric-magnetic force F2 is maximized when the arc A is generated at the outer most position P on the movable electrode 9.

(1) In a case when θ=0°

Figure 3:
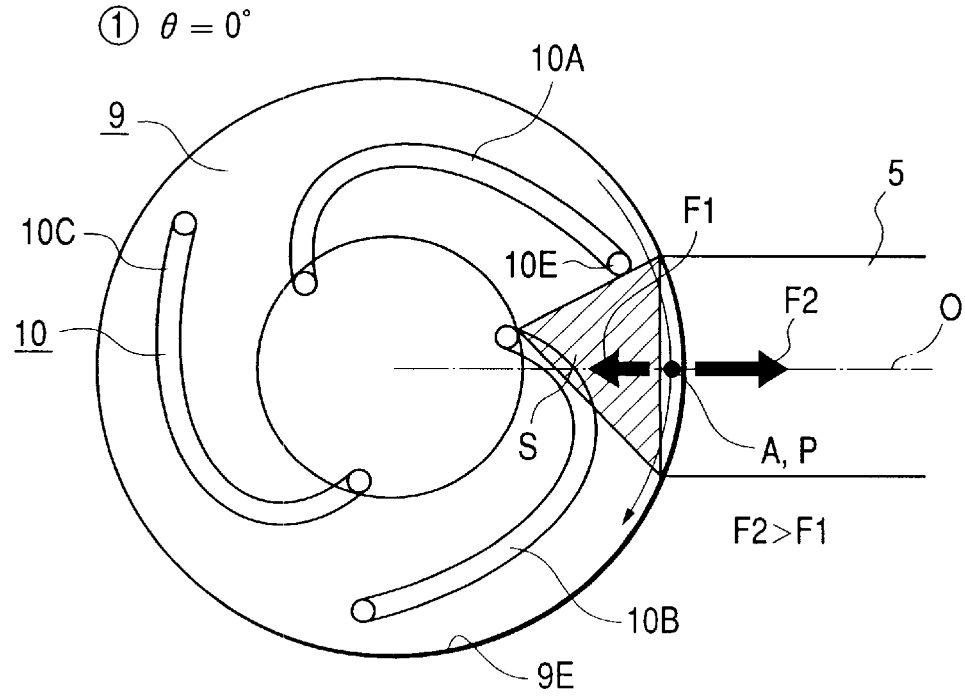
FIG. 3 is a plane view of the movable electrode shown in FIGS. 1 and 2.
Figure 8:
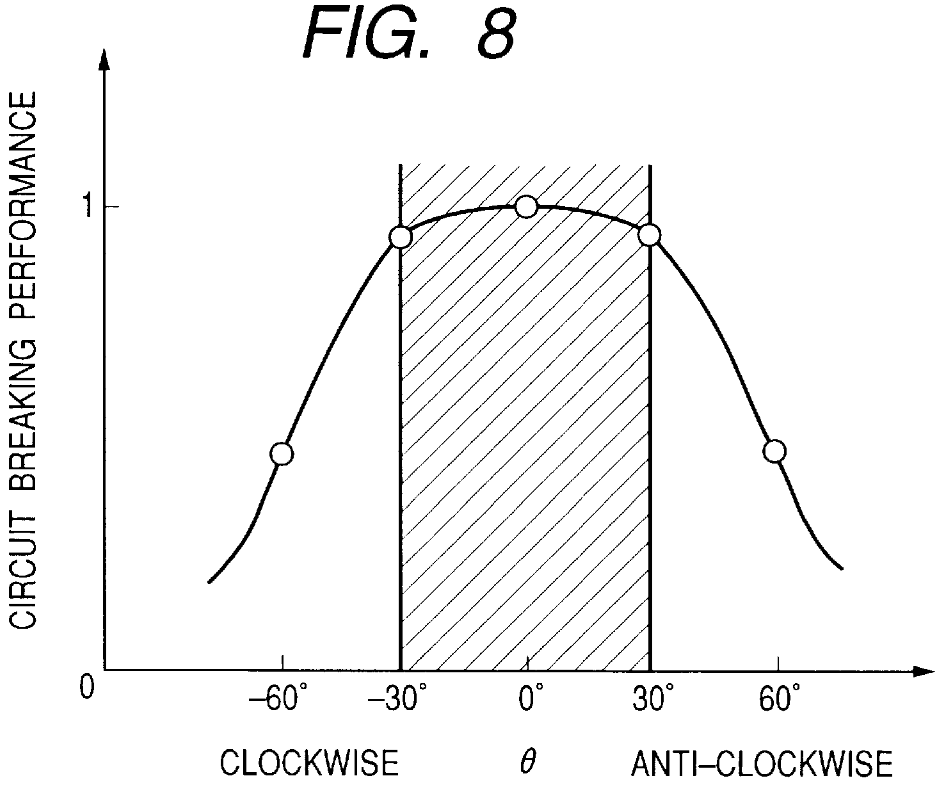
FIG. 8 is a characteristic diagram showing a relationship between a shifting angle of the movable electrode shown in FIG. 1 with respect to the movable conductor and circuit breaking performance of the concerned vacuum type switch gear devices.

On the other hand, because of the close location of the movable rod 5 to the movable electrode 9, an electric-magnetic force F1 induced by a magnetic field generated by a current flowing through the movable rod 5, which acts on the arc A in the opposite direction of the electric-magnetic force F2, is not negligible. As illustrated in FIG. 3, when the portion S on the movable electrode 9 is arranged so as to face the movable rod 5, the electric-magnetic force F2 caused by a current flowing through the portion S, more specifically a current loop constituted by both electrodes and the arc A, is larger than the electric-magnetic force F1. Thus, electric-magnetic force F2>electro-magnetic force F1. This is because when the arc A is generated at the position P nearest to the movable rod 5, the electric-magnetic force F2 is maximized. Through the thus induced electric-magnetic force F2, the arc A is pushed toward the electrode outer circumferential edge 9E and is magnetically driven along the surface of the electrode outer circumferential edge 9E, thereby the circuit breaking performance of the present vacuum circuit breaker is significantly improved as illustrated in FIG. 8.

(2) In a case when θ=30°

Figure 4:
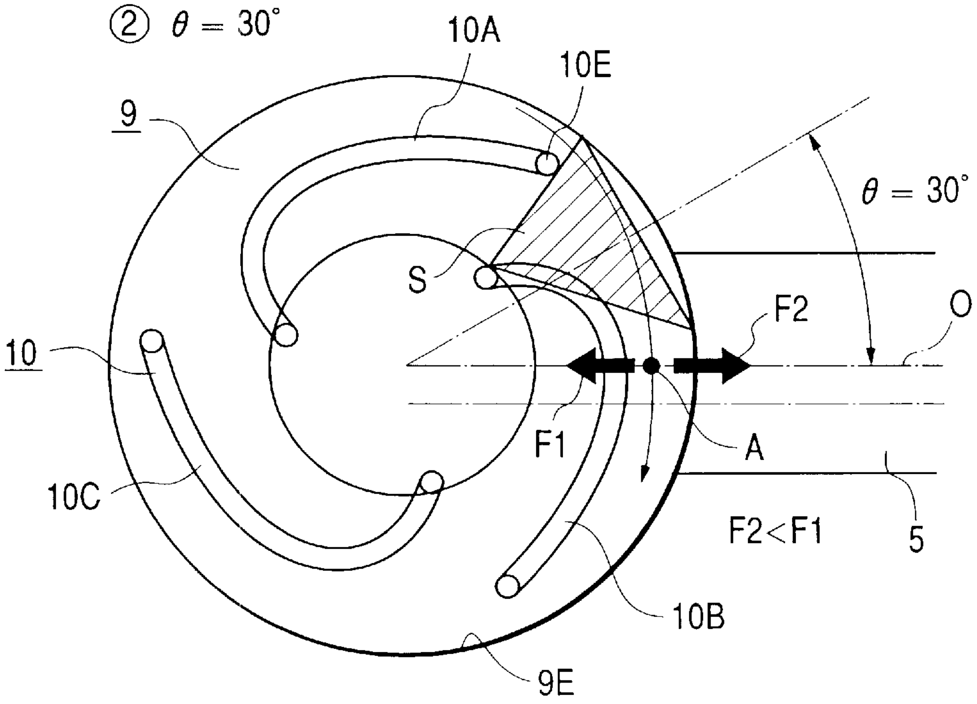
FIG. 4 is a plane view of the movable electrode when the movable electrode shown in FIGS. 1 and 2 is shifted in an anti-clockwise direction.

As illustrated in FIG. 4, the portion S on the movable electrode 9 is moved in a counter-clockwise direction by 30° with respect to the center line O of the movable rod 5. The electric-magnetic force F2 caused by a current flowing through the portion S is equal to or somewhat larger than the electric-magnetic force F1, namely, electric-magnetic force F2≧electro-magnetic force F1. Accordingly, the arc A is magnetically driven somewhat more inside from the electrode outer circumferential edge 9E in comparison with the case when θ=0°. Therefore, the circuit breaking performance of the present embodiment slightly reduces in comparison with the case when θ=20°. As illustrated in FIG. 8, however, the performance is still satisfactory.

(3) In a case when θ=60°

Figure 5:
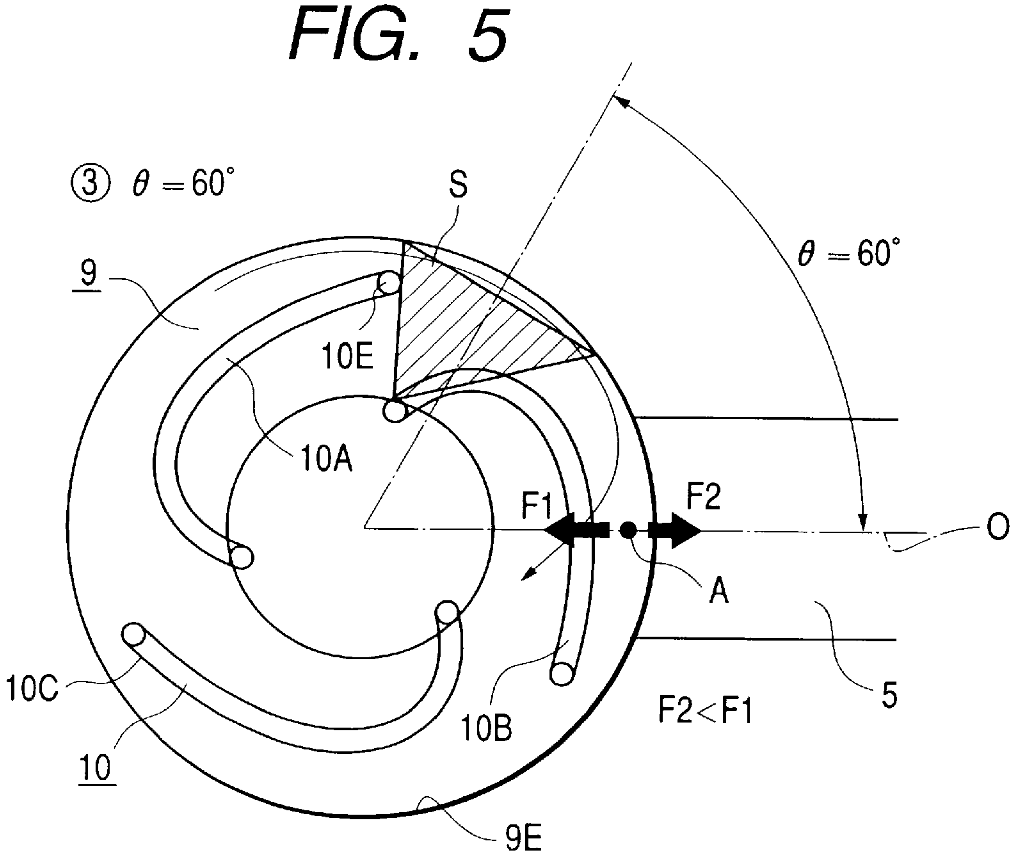
FIG. 5 is a plane view of the movable electrode when the movable electrode shown in FIGS. 1 and 2 is further shifted in anti-clockwise direction.

As illustrated in FIG. 5, the portion S on the movable electrode 9 is moved in a counter-clockwise direction by 60° with respect to the center line O of the movable rod 5. The electric-magnetic force F2 becomes weaker than the electric-magnetic force F1, namely, electric-magnetic force F1>electro-magnetic force F2. Accordingly, the arc A is pushed by the electric-magnetic force F1 inward between both the stationary and movable electrodes 8 and 9 where the magnetic driving force for the arc A is small in comparison with the case when θ=30°, and the arc A may stay at the center portion between the stationary and movable electrodes 8 and 9. Therefore, the circuit breaking performance of the present vacuum circuit breaker is deteriorated in comparison with the case when θ=30° and is unsatisfactory for use.

(4) In a case when θ=−30°

Figure 6:
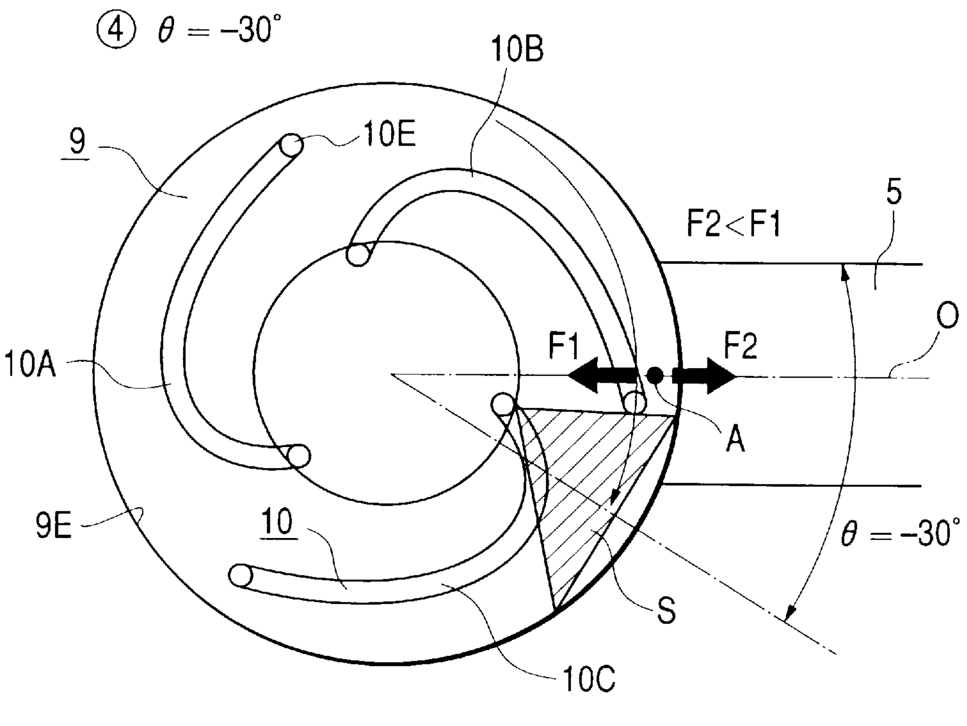
FIG. 6 is a plane view of the movable electrode when the movable electrode shown in FIGS. 1 and 2 is shifted in a clockwise direction.

The performance of the present vacuum circuit breaker in this case is the same as that of the case when θ=30°. The electric-magnetic force F2 cased by a current flowing through the portions S, when the portion S on the movable electrode 9 is shifted in a clockwise direction by 30° (−30°) with respect to the center line O of the movable rod 5 as illustrated in FIG. 6, is equal to or somewhat stronger than the electro-magnetic force F1, namely, electric-magnetic force F1≦electro-magnetic force F2. Accordingly, the arc A is magnetically driven somewhat inwardly on the electrodes from the electrode outer circumferential edge 9E in comparison with the case when θ=0°. Therefore, the circuit breaking performance of the present embodiment slightly reduces incomparison with the case when θ=0 as illustrated in FIG. 8. However, the performance is still satisfactory.

(5) In a case when θ=−60°

Figure 7:
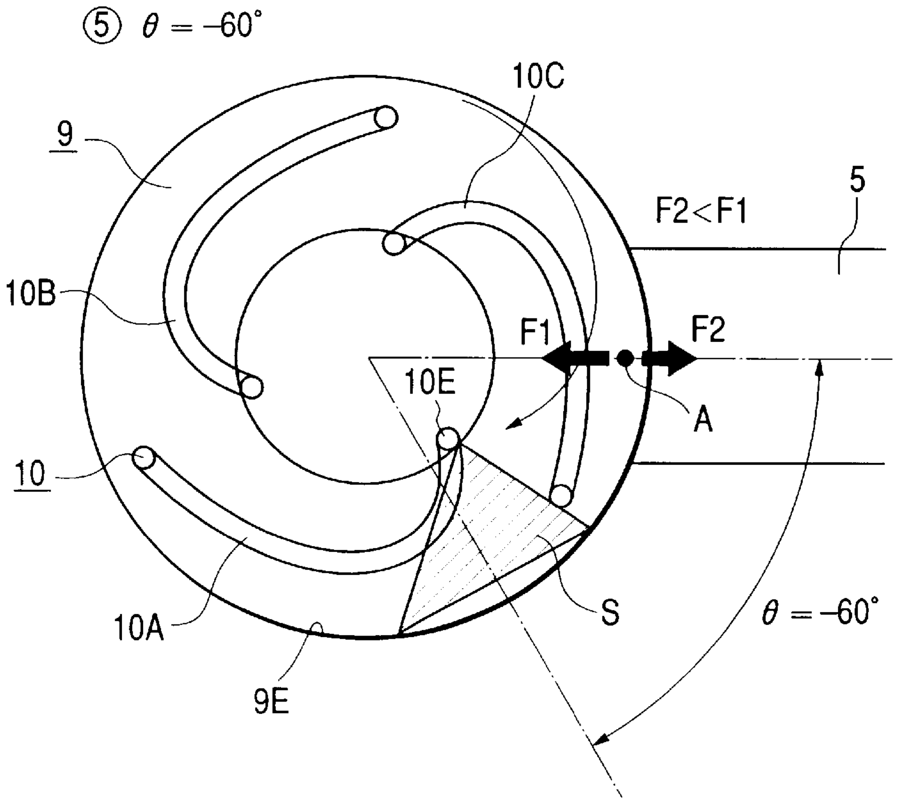
FIG. 7 is a plane view of the movable electrode when the movable electrode shown in FIGS. 1 and 2 is further shifted in a clockwise direction.

The performance of the present vacuum circuit breaker in this case is the same as that of the case when θ=60°. As illustrated in FIG. 7, the portion S on the movable electrode 9 is moved in clockwise direction by 60° (−60°) with respect to the center line O of the movable rod 5. The electric-magnetic force F2 becomes weaker than the electric-magnetic force F1, namely, electric-magnetic force F1>electro-magnetic force F2. Accordingly, the arc A is pushed by the electric-magnetic force F1 inward between the both stationary and movable electrodes 8 and 9 where the magnetic driving force for the arc A is small in comparison with the case when θ=−30°, and the arc A may stay at the center portion between the stationary and movable electrodes 8 and 9. Therefore, the circuit breaking performance of the present vacuum circuit breaker is deteriorated in comparison with the case when θ=−30° and is unsatisfactory for use.

According to the composite vacuum type switch gear devices of the present invention as has been explained, when the portion S on the movable electrode 9 is surrounded by a top end portion 10E of the arc groove 10A, another arc groove 10B neighboring thereto and an electrode outer circumferential edge 9E is arranged so as to face the movable rod 5, when θ=0, the relationship of electric-magnetic force F2>electric-magnetic for F1 is kept. Therefore, through the electric-magnetic force F2, the arc A is pushed toward the electrodes outer circumferential edge 9E and is magnetically driven along the electrode surface of the outer circumferential edge of thereof. Accordingly, the circuit breaking performance of the vacuum circuit breaker is significantly improved as illustrated in FIG. 8 and the size of the vacuum bulb 30 according to the present invention can also be reduced in comparison with a conventional one in which the above explained portion S is not arranged so as to face the movable rod 5.

Further, before assembling the vacuum bulb 30, the movable electrode 9 is in advance connected to the movable rod 5 so that the portion S faces the movable rod 5, and there are no possibilities that the portion S is arranged otherwise with respect to the movable rod 5 and the assembly work of the movable electrode 9 with the movable rod 5 is greatly facilitated. The connection assembly of the movable electrode 9 with the movable rod 5 is performed such as by integrally molding both from molten metal and by soldering the movable electrode 9 to the movable rod 5. In these instances the portion S on the movable electrode 9 is of course arranged so as to face the movable rod 5.

In the above embodiments, the magnitude of the electric-magnetic force F2 can be freely adjusted by shifting the angle of the portion S with respect to the movable rod 5 in a clockwise or a counter-clockwise direction, and the arc A can be magnetically driven at any radial position along the electrode surface with respect to the outer circumferential edge.

Further, modifications of the above embodiments are ones in which the portion S is arranged so as to be shifted with respect to the movable rod 5 in a range between 30° in a clockwise direction and 30° in a counter-clockwise direction, and the modifications can achieve a stable circuit breaking performance without deteriorating their circuit breaking performance.

Although not specifically illustrated and explained, the arrangement of the plurality of arc grooves formed on the stationary electrode 8, is the same as those on the movable electrode 9, and the portions S on the both electrodes are arranged in the same direction and face each other.

As an alternative the arc grooves can be provided either on the stationary electrode 8 or on the movable electrode 9.

Figure 9:
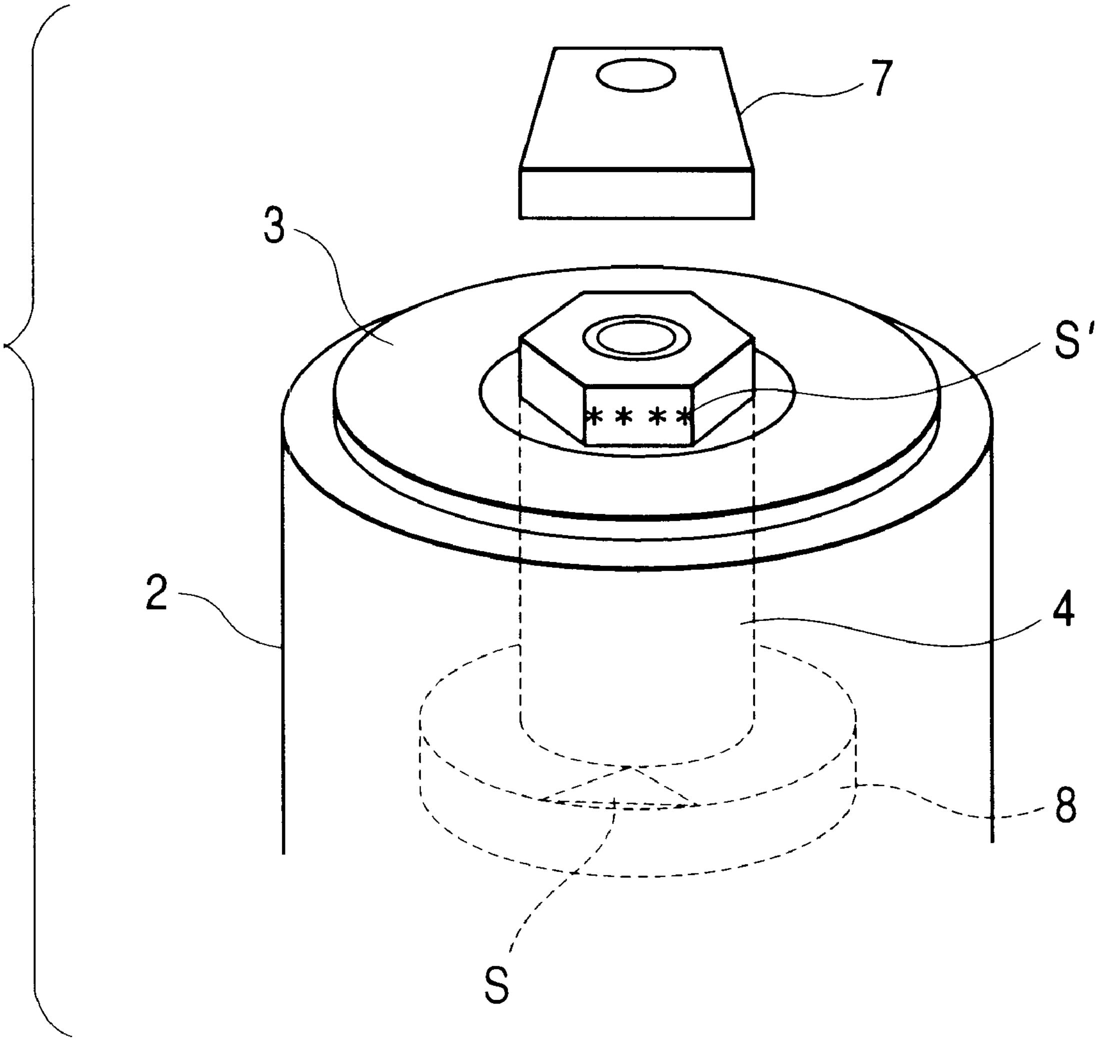
FIG. 9 is a partial perspective view of a modified embodiment of FIG. 1 of the present invention; and, FIG. 10 is a cross sectional view of a composite vacuum type switch gear device using the modified embodiment shown in FIG. 9.
Figure 10:
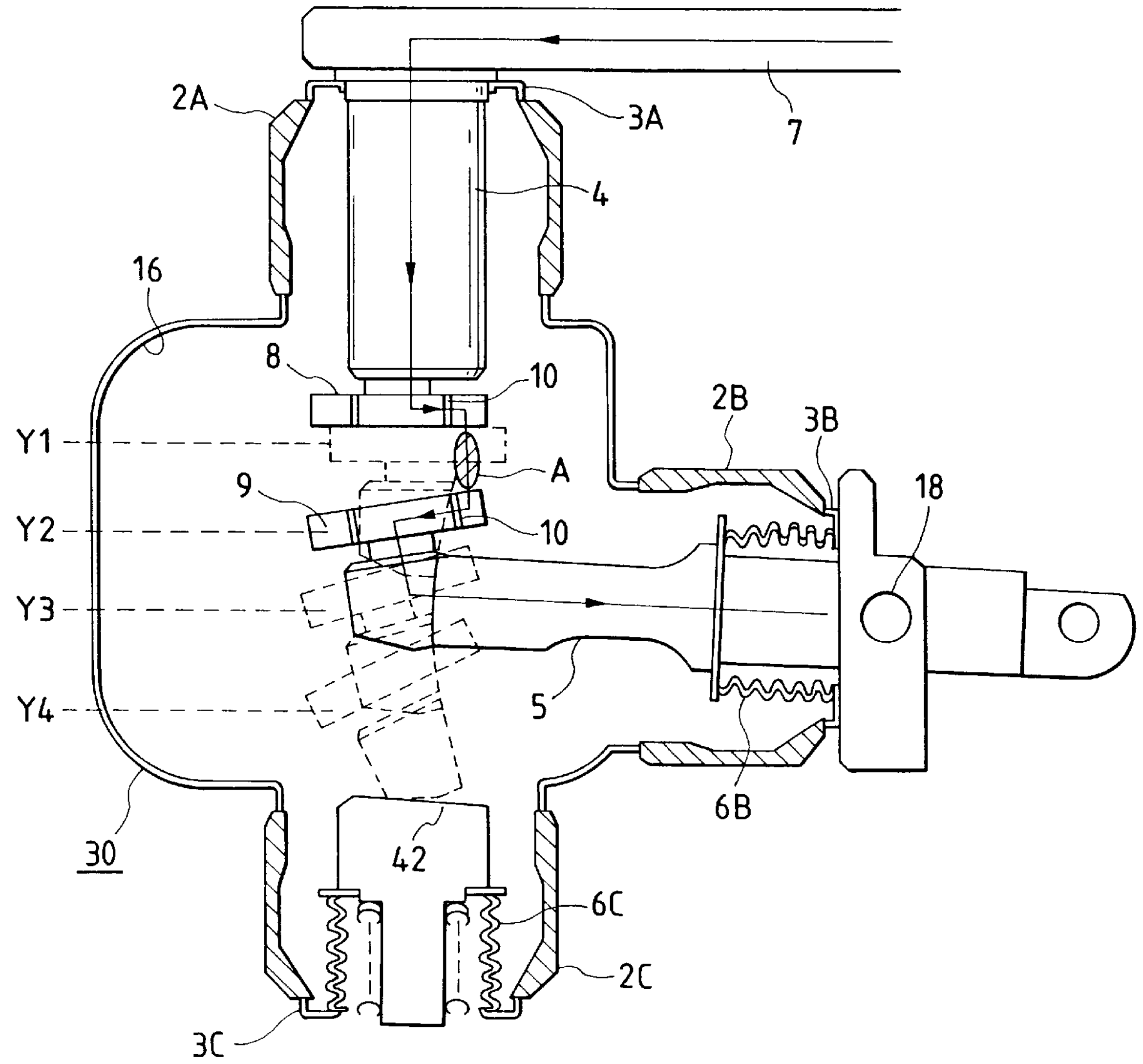

Further, FIG. 9 and FIG. 10 show another embodiment in which the stationary rod 4 extends from the back face of the stationary electrode 8 to the outside of the vacuum bulb 30, the external conductor 7 extends in an orthogonal direction with respect to the stationary rod 4, a plurality of arc grooves are provided on the face of the stationary electrode 8, and when assuming a portion formed between a top end portion 10E of the arc groove 10A, another arc groove 10B neighboring thereto and an electrode outer circumferential edge as S, a mark S'. Thereby is applied on the stationary rod 4 at a visible area on the same side as the portion S, and the external conductor 7 is extended from the stationary rod 4 from the side of the mark S'. Thereby the assembly work, in which the portion S is arranged so as to correspond to the external conductor 7, is greatly facilitated and the efficiency of the assembly work is significantly improved. Further, with the arrangement of the external conductor 7 with respect to the portion S on the stationary electrode 8, an adverse effect of a current flowing through the external conductor 7 against the arc A is also controlled.

With the composite vacuum type switch gear device according to the present invention as has been explained above, when the portion S on the electrode surrounded by a top end portion 10E of the arc groove 10A, another arc groove 10B neighboring thereto and an electrode outer circumferential edge 9E is arranged so as to face the movable rod 5, the electric-magnetic force F2 at the side of electrodes becomes stronger than the electric-magnetic force F1 at the side of the movable rod 5, and the arc A generated is pushed toward the outer circumferential edge of the electrodes and is magnetically driven along the surface near the outer circumferential edge of the electrodes. Accordingly, the circuit breaking performance of the present vacuum circuit breaker is greatly improved as shown in FIG. 8 and the size of the vacuum bulb 30, according to the present invention can be reduced in comparison with conventional ones in which the portion S was not arranged so as to face the movable rod 5.

Further, before assembling the vacuum bulb 30 the movable electrode 9 is in advance connected to the movable rod 5 so that the portion S faces the movable rod 5. Accordingly, there are no possibilities that the portion S is arranged otherwise with respect to the movable rod 5 and the assembly work of the movable electrode 9 with respect to the movable rod 5 is greatly facilitated.

What is claimed is:

1. A composite vacuum type switch gear device including a movable electrode which is designed to open and close with respect to a stationary electrode and a grounding electrode which are disposed in an opposing manner within a vacuum bulb and a movable conductor, one end of which carries the movable electrode and the other end of which extends outside from the vacuum bulb, wherein the movable conductor is rotatably supported by a main axis so as to permit opening and closing of the movable electrode with respect to both stationary and grounding electrodes and a plurality of arc grooves are provided on one face of the movable electrode, characterized in that a portion of said face surrounded by a top end portion of one of the arc grooves, a neighboring other arc groove and the outer circumferential edge portion of the movable electrode is placed so as to face the movable conductor.

2. A composite vacuum type switch gear device including a movable electrode which is designed to open and close with respect to a stationary electrode and a grounding electrode which are disposed in an opposing manner within a vacuum bulb and a movable conductor, one end of which carries the movable electrode and the other end of which extends outside from the vacuum bulb, wherein the movable conductor is rotatably supported by a main axis so as to permit opening and closing of the movable electrode with respect to both stationary and grounding electrodes and a plurality of arc grooves are provided on one face of the movable electrode, characterized in that an electromagnetic force acting on an arc generated between the movable electrode and the stationary electrode is adjusted by shifting a portion of said face surrounded by a top end portion of one of the arc grooves, a neighboring other arc groove and the outer circumferential edge portion of the movable electrode toward a clockwise direction or a counter-clockwise direction with respect to the movable conductor.

3. A composite vacuum type switch gear device including a movable electrode which is designed to open and close with respect to a stationary electrode and a grounding electrode which are disposed in an opposing manner within a vacuum bulb and a movable conductor, one end of which carries the movable electrode and the other end of which extends outside from the vacuum bulb, wherein the movable conductor is rotatably supported by a main axis so as to permit opening and closing of the movable electrode with respect to both stationary and grounding electrodes and a plurality of arc grooves are provided on one face of the movable electrode, characterized in that a portion of said surface surrounded by a top end portion of one of the arc grooves, a neighboring other arc groove and the outer circumferential edge portion of the movable electrode is shifted in a clockwise direction or a counter-clockwise direction in a range of 30° from the center portion in a width direction of the movable conductor.

4. A composite vacuum type switch gear device including a movable electrode which is designed to open and close with respect to a stationary electrode and a grounding electrode which are disposed in an opposing manner within a vacuum bulb and a movable conductor, one end of which carries the movable electrode and the other end of which extends outside from the vacuum bulb, wherein the movable conductor is rotatably supported by a main axis so as to permit opening and closing of the movable electrode with respect to both stationary and grounding electrodes, an external conductor extends in an orthogonal direction with respect to a stationary conductor which carries the stationary electrode and extends from the back face of the stationary electrode to the outside of the vacuum bulb and a plurality of arc grooves are provided on one stationary electrode face opposing the movable electrode face, characterized in that a portion of said stationary electrode face surrounded by a top end portion of one of the arc grooves, a neighboring other arc groove and the outer circumferential edge portion of the stationary electrode is placed so as to face the external conductor.

5. A composite vacuum type switch gear device according to claim 4, characterized in that a mark is added at a visible area of the stationary conductor on the same side as said portion of said stationary electrode face surrounded by a top end portion of one of the arc grooves, a neighboring other arc groove and the outer circumferential edge portion of the stationary electrode.

6. A vacuum type switch gear device having an L shaped stationary and movable conductors arrangement comprising;

a vacuum bulb;

a stationary conductor a part of which is disposed in said vacuum bulb;

a stationary electrode carried by said stationary conductor at one end thereof in said vacuum bulb;

a movable conductor disposed in said vacuum bulb and extending substantially orthogonal with respect to the extending direction of said stationary conductor, said movable conductor being supported rotatably by said vacuum bulb;

a movable electrode carried by said movable conductor at one end thereof in said vacuum bulb, and being permitted engagement and disengagement thereof with said stationary electrode through rotation of said movable conductor;

a plurality of spiral arc grooves provided on a surface of said stationary electrode facing said movable electrode; and, a plurality of spiral arc grooves provided on a surface of said movable electrode facing said stationary electrode, wherein a transitive portion of said surface of said movable electrode from one spiral arc groove to adjacent another spiral arc groove on said surface of said movable electrode defined by a terminating end portion of said one spiral groove, a starting end of said adjacent other spiral groove and the outer circumferential edge portion of said movable electrode is arranged in a substantially overlapping relationship in a vertical direction with said movable conductor.

7. A vacuum type switch gear device according to claim 6, wherein a transitive portion of said surface of said stationary electrode from one spiral arc groove to adjacent another spiral arc groove on said surface of said stationary electrode defined by a terminating end portion of said one spiral groove, a starting end of said adjacent other spiral groove and the outer circumferential edge portion of said stationary electrode is arranged in a substantially overlapping relationship in a vertical direction with said transitive portion on said movable electrode.

8. A vacuum type switch gear device according to claim 7, further comprising an external conductor connected to said stationary conductor, wherein said external conductor extends substantially orthogonal with respect to the extending direction of said stationary conductor and being arranged in a substantially overlapping relationship in a vertical direction with said transitive portion on said stationary electrode.

* * * * *